United States Patent
Pansier (10) Patent No.: US 9,467,048 B2
(45) Date of Patent: Oct. 11, 2016

(54) VOLTAGE GENERATOR

(71) Applicant: NXP B.V., Eindhoven (NL)

(72) Inventor: Frans Pansier, Nuenen (NL)

(73) Assignee: NXP B.V., Eindhoven (NL)

( * ) Notice: Subject to any disclaimer, the term of this patent is extended or adjusted under 35 U.S.C. 154(b) by 32 days.

(21) Appl. No.: 14/252,877

(22) Filed: Apr. 15, 2014

(65) Prior Publication Data

US 2014/0320096 A1    Oct. 30, 2014

(30) Foreign Application Priority Data

Apr. 29, 2013  (EP) .................................... 13165828

(51) Int. Cl.
*G05F 1/00* (2006.01)
*H02M 3/158* (2006.01)
(Continued)

(52) U.S. Cl.
CPC ..... *H02M 3/158* (2013.01); *H02M 2001/0058* (2013.01); *H02M 2007/4815* (2013.01); *Y02B 70/1425* (2013.01); *Y02B 70/1441* (2013.01); *Y02B 70/1491* (2013.01)

(58) Field of Classification Search
CPC ...................... H02M 3/158; H02M 2001/0058
USPC .................. 363/15, 16, 17, 21.01–21.03, 363/21.06–21.08, 21.12, 21.15, 21.17, 363/21.18, 23, 34, 37; 323/234, 237, 265, 323/266, 271, 273, 275, 282–285
See application file for complete search history.

(56) References Cited

U.S. PATENT DOCUMENTS

2002/0008501 A1* 1/2002 Telefus ................. H02M 3/156
                                                            323/282

2009/0290385 A1* 11/2009 Jungreis .............. H02M 1/4241
                                                            363/17
2010/0052566 A1    3/2010 Kitamura et al.
(Continued)

FOREIGN PATENT DOCUMENTS

| CN | 201750352 U | 2/2011 |
| CN | 102570821 A | 7/2012 |
| EP | 2 445 098 A1 | 4/2012 |
| WO | 2009/037613 A1 | 3/2009 |

OTHER PUBLICATIONS

Rivetta, C., et al; "HV Resonant Converter for Photomultipliers Tube Bases"; IEEE Nuclear Science Symposium and Medical Imaging Conference, Oct. 25-31, 1992, Orlando, FL, US; IEEE, New York, NY, USA; pp. 438-440 (Oct. 25, 1992).

(Continued)

*Primary Examiner* — Adolf Berhane
*Assistant Examiner* — Afework Demisse (57) ABSTRACT

The disclosure relates to a voltage generator for providing an output voltage in accordance with a received target signal, the voltage generator comprising: a resonant converter configured to receive an input voltage, the resonant converter comprising: a first switch; a second switch connected in series with the first switch between the input voltage and ground (GND); a resonant tank associated with the second switch; an output capacitor coupled to the resonant tank and configured to provide an output voltage; and a rectifier configured to allow charge to flow in a single direction between the resonant tank and the output capacitor; and a controller configured to receive the target signal and to set an operating parameter of the resonant converter in accordance with a difference between an output value which is related to the output voltage and the target signal.

17 Claims, 5 Drawing Sheets

(51) Int. Cl.
*H02M 1/00* (2006.01)
*H02M 7/48* (2007.01)

(56) References Cited

U.S. PATENT DOCUMENTS

2011/0187335 A1    8/2011  Grakist et al.
2015/0171729 A1*   6/2015  Scandola ............ H02M 3/158
                                                        363/21.02

OTHER PUBLICATIONS

Garcia, V., et al; "Using the Hybrid Series-Parallel Resonant Converter with Capacitive Output Filter and with PWM Phase-Shifted Control for High-Voltage Applications"; Industrial Electronics, Control and Instrumentation, vol. 3; pp. 1659-1664 (Sep. 5, 1994).

Dmowski, A., et al; "A Novel Series-Resonant DC/DC Converter with Full Control of Output Voltage at No-load Condition—computer Simulation Based Design Aspects"; Proceedings of the Industry Applications Society Annual Meeting, Houston, TX, USA; IEEE, New York, NY, USA; pp. 924-928 (Oct. 4, 1992).

O'Modhrain, S.; "Touch and Go—Designing Haptic Feedback for a Hand-Held Mobile Device"; BT Technology Journal; Springer, Dordrecht, NL, vol. 22, No. 4; pp. 139-145 (Oct. 4, 2004).

NXP; "AN10881, TEA1713 resonant power supply control IC with PFC, Rev. 2, Application Note"; 102 pages (Sep. 26, 2011).

Extended European Search Report for application No. 13165828.8 (Sep. 26, 2013).

* cited by examiner

VOLTAGE GENERATOR

CROSS-REFERENCE TO RELATED APPLICATIONS

This application claims the priority under 35 U.S.C. §119 of European patent application no. 13165828.8, filed on Apr. 29, 2013 the contents of which are incorporated by reference herein.

The present disclosure relates to voltage generators. Specifically, voltage generators for providing an output voltage in accordance with a received ramp, or target, signal.

Some applications require a high voltage (for example 3 kV) signal to be generated from a low voltage source, such as a Li-ion battery with a DC output of 2.7 V to 4.2 V. For example haptic feedback for mobile device applications can require a high voltage to be generated from a low voltage source. Such applications may also demand a specific rate of voltage ramping so that the generated high voltage relates to a desired level of haptic feedback.

A high voltage generator may be provided using a capacitive voltage multiplier. In such a voltage generator an input voltage for the multiplier is generated as a square wave voltage using a half bridge configuration. The rate of increase of the output voltage can be controlled by varying the switching frequency of the square wave input voltage of the half-bridge. A disadvantage of such voltage generators is that a high number of capacitive stages are required in order to provide a high conversion ratio (Vout/Vin). Providing such a voltage multiplier therefore involves a large number of components and occupies a correspondingly large PCB area. These disadvantages are particularly relevant to voltage generators that have a low input voltage.

The number of stages in a capacitive voltage multiplier can be reduced by introducing an intermediate converter, boosting the input voltage to a higher level. Such a modification reduces the number of multiplier stages but introduces an additional stage and also introduces additional losses, as the efficiency of the additional converter usually drops when the conversion ratio is very high (of the order of a thousand).

According to an embodiment of the present invention there is provided a voltage generator for providing an output voltage in accordance with a received target signal, the voltage generator comprising:
- a resonant converter configured to receive an input voltage, the resonant converter comprising:
  - a first switch;
  - a second switch connected in series with the first switch between the input voltage and ground;
  - a resonant tank associated with the second switch;
  - an output capacitor coupled to the resonant tank and configured to provide an output voltage; and
  - a rectifier configured to allow charge to flow in a single direction between the resonant tank and the output capacitor; and
- a controller configured to receive the target signal and to set an operating parameter of the resonant converter in accordance with a difference between an output value which is related to the output voltage and the received ramp signal.

The voltage generator uses a resonant topology and so may occupy less space and require fewer components than an equivalent capacitive voltage multiplier voltage generator. The controller can provide the functionality of conforming the output voltage to the desired voltage indicated by the target signal, which may be a ramp signal. The ramp signal may be provided by a haptic feedback application of a mobile computing device, for example.

The operating parameter may be a state of the first switch or the second switch. Setting an operating parameter may comprise toggling the states of the first switch and second switch. The output value may be the output voltage.

The controller may be configured to set the operating parameter in accordance with a comparison between a value related to a current in the resonant tank and a value related to the difference. The value related to the current in the resonant tank may be the current in the resonant tank. The controller may be configured to set the operating parameter when the value related to the resonant tank current is greater than the value related to the difference. The controller may be configured to operate the first and second switches at a specific point in time during a sinusoidal resonant tank current, such that the operating parameter is the phase of the sinusoidal resonant tank current at which the first and second switches are operated. The value related to the difference may be a modulus of the difference. Alternatively, the value related to the difference may be the difference.

The controller may be configured to operate the first and second switches according to a switching cycle that has a switching frequency. The operating parameter may be the switching frequency. The controller may be configured to restrict the operation of the first and second switches to switching frequencies that are greater than or equal to a resonant frequency of the resonant tank. The controller may be configured to increase the switching frequency if the output value is greater than the target signal. The controller may be configured to decrease the switching frequency if the output value is less than the target signal. The controller may be configured to decrease the switching frequency only if the switching frequency is greater than or equal to a resonant frequency of the resonant tank.

The operating parameter may be the input voltage of the resonant converter. The voltage generator may comprise a first stage converter configured to receive a supply voltage and to provide the input voltage of the resonant converter. The controller may comprise a switching controller configured to operate the first stage converter in accordance with the difference between the output value and the target signal. The first stage converter may be a boost converter. The boost converter may comprise a boost inductor with a first terminal and a second terminal. The first terminal may be connected to the supply voltage. The boost converter may comprise a boost rectifier. The boost rectifier may be connected to the second terminal of the boost inductor. The boost rectifier may be configured to provide the input voltage of the resonant converter. The boost converter may comprise a boost switch connected between the second terminal of the boost inductor and ground. The switching controller may be configured to operate the boost switch in accordance with the difference between the output value and the target signal.

According to a further aspect of the invention there is provided a mobile computing device comprising the voltage generator. The mobile computing device may be a mobile telephone, which may have a touch screen for which haptic feedback is required. The voltage generator may be well suited for providing an output voltage for driving such haptic feedback.

Embodiments of the present invention will now be described by way of example and with reference to the accompanying drawings in which:

FIG. 2b illustrates an example circuit diagram for a voltage generator in accordance with the block diagram of FIG. 2a;

FIG. 3b illustrates an example circuit diagram for a voltage generator in accordance with the block diagram of FIG. 3a;

FIG. 4b illustrates an example circuit diagram for a voltage generator in accordance with the block diagram of FIG. 4a.

Figure 1:
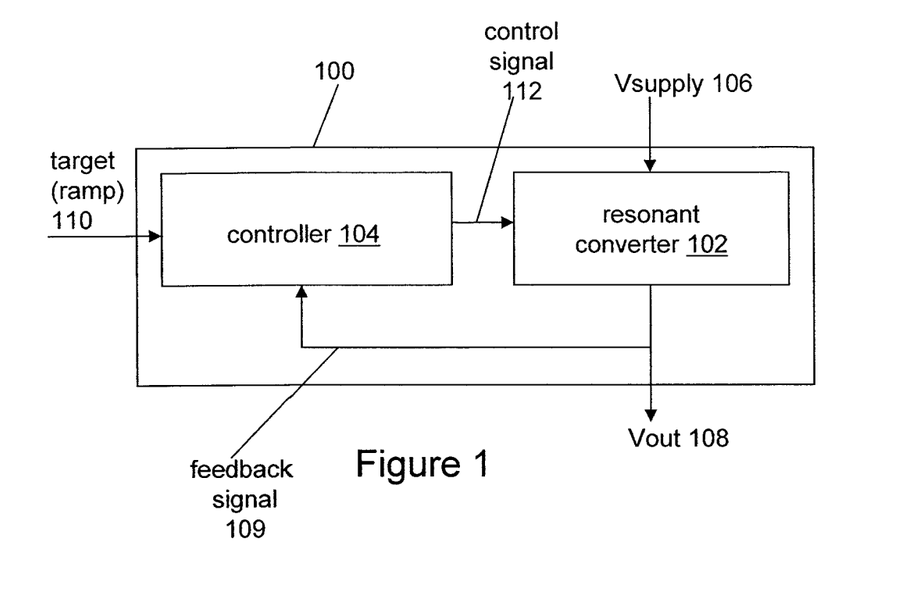
FIG. 1 illustrates a block diagram of a voltage generator comprising a controller that is configured to set an operating parameter of a resonant converter in accordance with a received target signal in order to provide a desired output voltage.

FIG. 1 illustrates a block diagram of a voltage generator 100 that is configured to receive a supply voltage (Vsupply) 106 and provide an output voltage (Vout) 108 in accordance with a received target, or ramp, signal 110. The voltage generator 100 can be used to generate a high voltage in accordance with a desired ramp rate as specified by the target signal 110. A specific example of where such a voltage generator 100 may be used is in the provision of haptic feedback in mobile device applications. Such examples may benefit from a physically small circuit that can provide a high voltage waveform of a desired shape from a low voltage supply.

The voltage generator 100 comprises a resonant converter 102 and a controller 104. The controller 104 is configured to receive the target signal 110 and a feedback signal 109 from the resonant converter 102. The feedback signal is representative of an output value of the resonant converter, which in this example is related to the output voltage (Vout) 108. The controller 104 can then send a control signal 112 to set an operating parameter of the resonant converter 102 in accordance with a difference between the feedback signal 109 and the target signal 110.

Figure 2A:
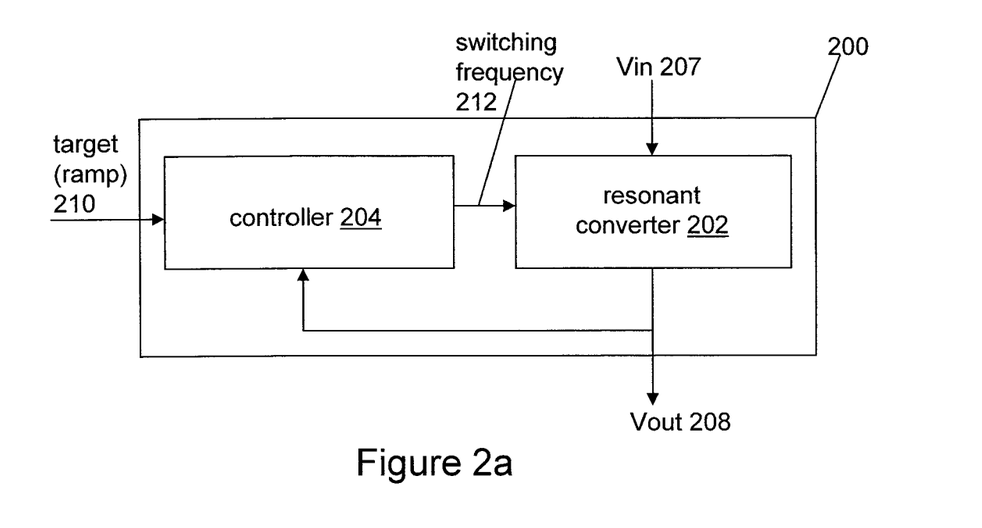
FIG. 2a illustrates a block diagram of a voltage generator similar to that of FIG. 1 in which the operating parameter is a switching frequency of the resonant converter.
Figure 2B:
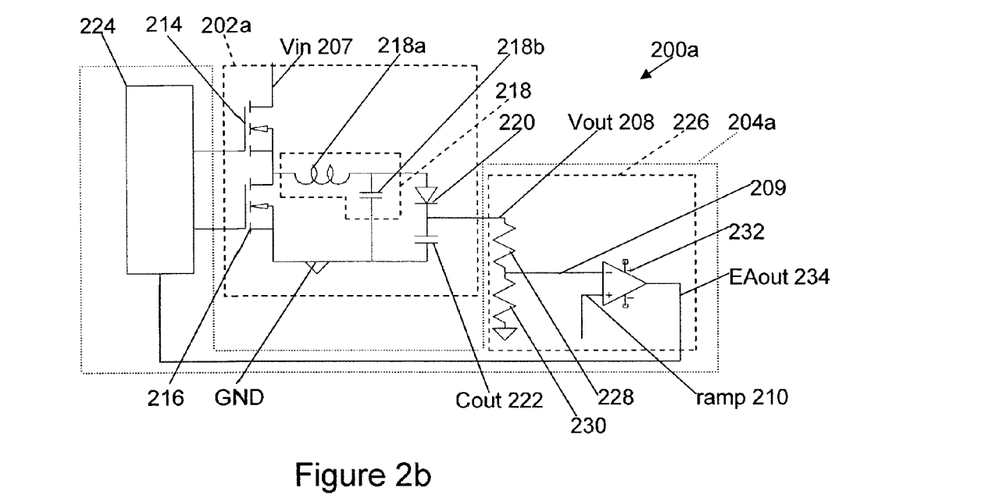
Figure 2C:
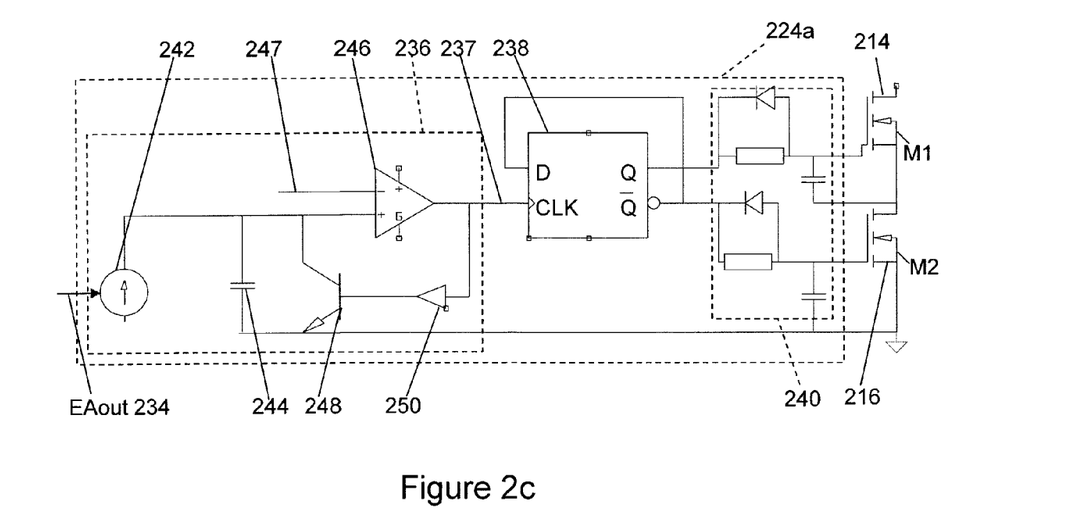
FIG. 2c illustrates an example circuit diagram for a switching controller for use in the circuit of FIG. 2b.
Figure 3A:
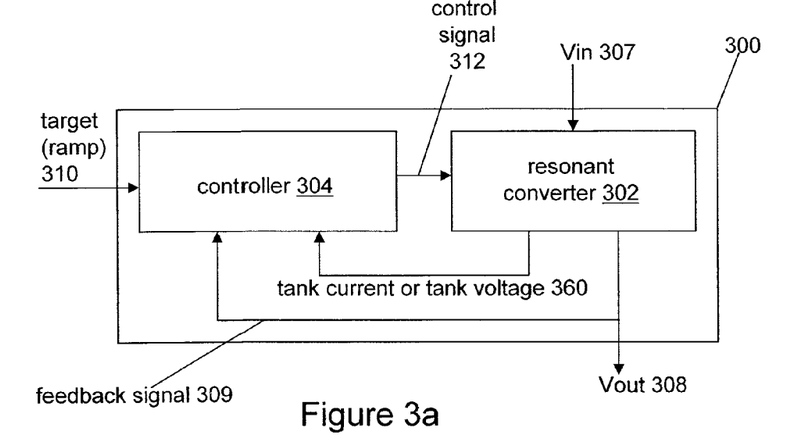
FIG. 3a illustrates a block diagram of another voltage generator similar to FIG. 1 in which the operating parameter is a state of switches of the resonant converter and the controller further determines when to operate the switches in accordance with a current within the resonant converter.
Figure 3B:
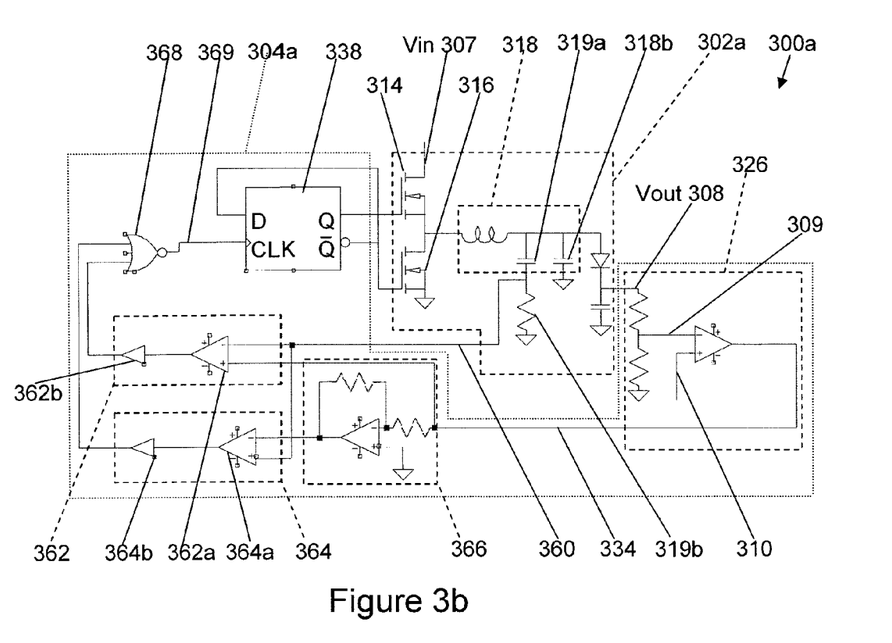
Figure 3C:
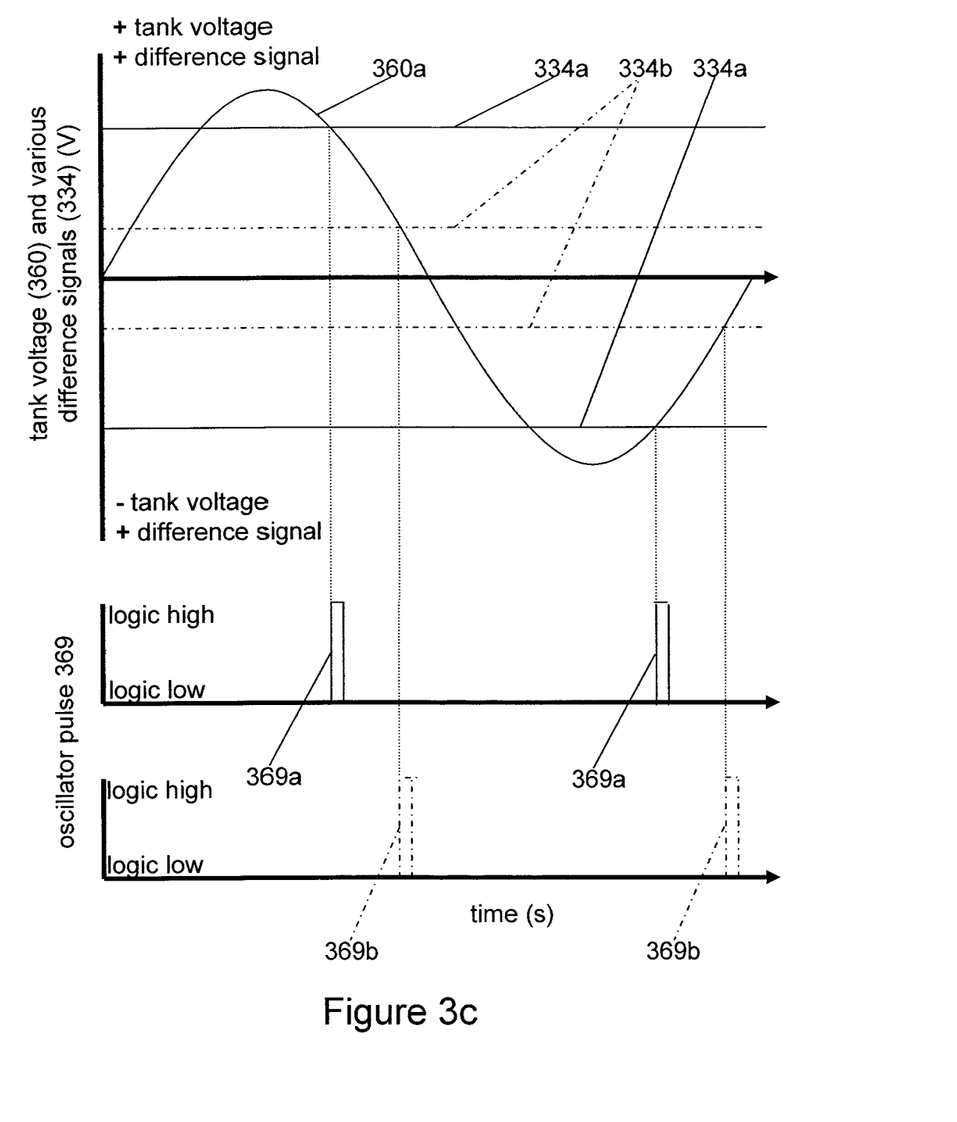
FIG. 3c illustrates signals within the voltage generator of FIG. 3b.
Figure 4A:
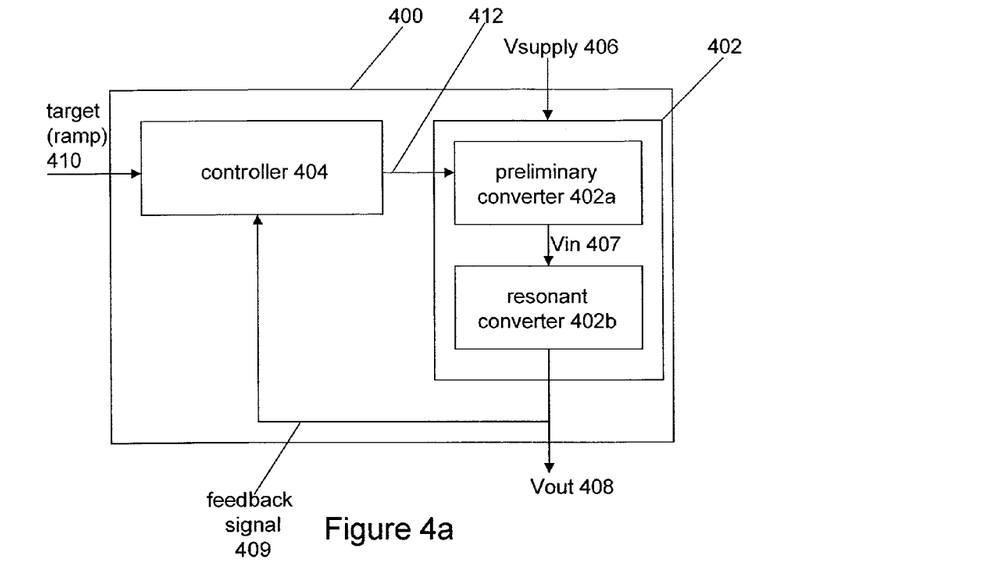
FIG. 4a illustrates a block diagram of another voltage generator similar to FIG. 1 that comprises a preliminary converter, where the operating parameter is an input voltage of the resonant converter provided by the preliminary converter.
Figure 4B:
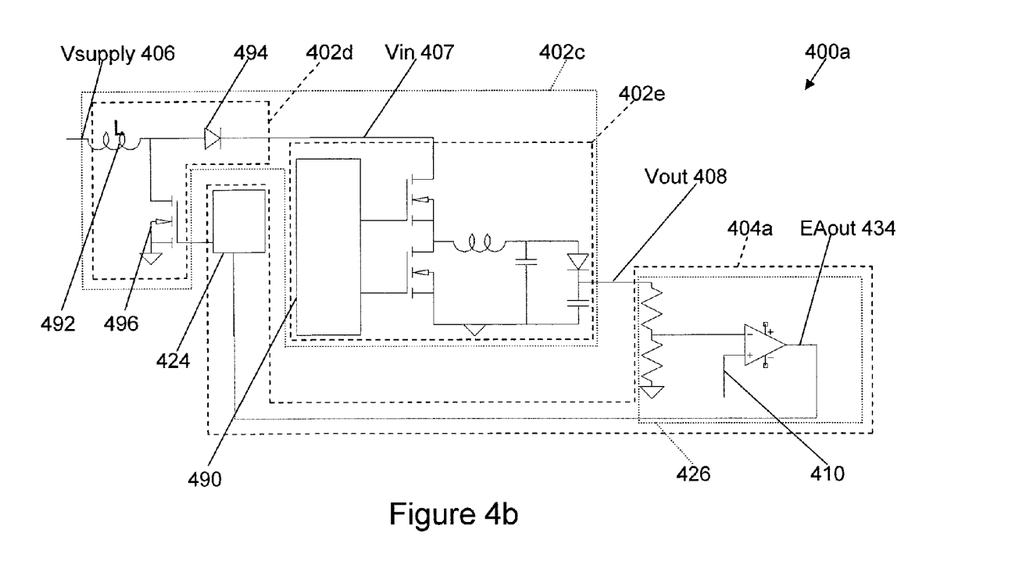

Various preferred and optional features of the voltage generator are described further with reference to FIGS. 2 to 4. The voltage generators described herein may be provided using off-the-shelf components. Alternatively, components may be custom made in order to reduce a PCB footprint of the voltage generator.

FIGS. 2a and 2b illustrate a voltage generator 200, 200a similar to that of FIG. 1 in which the operating parameter that is set by the controller is a switching frequency 212 of the resonant converter 202.

FIG. 2a illustrates a block diagram of the voltage generator 200. Any mismatch between the switching frequency represented by the control signal 212 applied by the controller 204 and the resonant frequency of the resonant converter 204 leads to a lower rate of increase in the output voltage (Vout) 208. This is because the resonant converter 202 operates sub-optimally (in terms of maximising output voltage) if the switching frequency does not match the resonant frequency. The controller 204 uses this principle to ensure that the output voltage (Vout) 208 of the resonant converter 202 corresponds to a desired voltage indicated by the target (ramp) signal 210.

The operation of the voltage generator may be better understood by reference to FIGS. 2b and 2c, which illustrate circuit diagrams for an example voltage generator 200a. The voltage generator 200a comprises a resonant converter 202a and a controller 204a. The resonant converter 202a of FIG. 2b comprises a first switch 214, a second switch 216, a resonant tank 218, a rectifier 220 and an output capacitor 222.

Isolation between an input voltage 207 and an output voltage 208 of the resonant converter 202a may not be required in applications that generate a high voltage from a battery. It is therefore not essential for the resonant converter 202a to comprise a transformer. As such, space can be saved, as can the component cost of a transformer.

The first switch 214 is connected in series with the second switch 216 between the input voltage (Vin) 207 and ground (GND). In this example, the input voltage 207 can be considered to be a supply voltage. The first and second switches 214, 216 can be provided as transistor switches, such as the MOSFETs illustrated in FIG. 2b in which case the drain-source conduction channels of the respective FET switches 214, 216 are provided in series.

The resonant tank 218 may contain any arrangement of components that provide impedance. In this example, the resonant tank 218 comprises a tank inductor 218a and a tank capacitor 218b provided in series with each other. The resonant tank 218 is associated with the second switch 216. In this example the resonant tank 218 is provided in parallel with the second switch 216.

A square wave potential can be applied to the resonant tank 218 at the node between the first and second switches 214, 216 by alternately toggling the states of the first and second switches 214, 216. If the toggling of the switches 214, 216 is performed at an appropriate frequency (given the impendence of the tank 218) then each switching action can add an amount of energy to the resonant tank 218. For a fixed switching frequency, a fixed amount of energy is added to the resonant tank 218 per switching cycle. An alternating current (AC) waveform is generated in the resonant tank 218 at a connecting node of the resonant inductor 218a and the resonant capacitor 218b. The RMS voltage of the AC waveform is proportional to the amount of energy stored in the resonant tank 218.

The output capacitor 222 has a first plate and a second plate. The second plate of the output capacitor 222 is connected to ground (GND).

The rectifier 220 couples the first plate of the output capacitor 222 to the resonant tank 218. In this example, the output capacitor 222 is coupled in parallel with the tank capacitor 218b. The rectifier 220 can be provided by a diode and is configured to allow charge to flow in a single direction between the resonant tank 218 and the output capacitor 222 such that energy can be passed to the output from the resonant tank during half of the switching cycle, but not flow back from the output to the resonant tank during the other half of the switching cycle. An output voltage (Vout) 208 can be taken between the first plate of the output capacitor 222 and ground (GND).

The rectifier allows charge to flow when the instantaneous value of the AC wave in the resonant tank 218 is greater than the (DC) output voltage (Vout) 208 stored by the capacitor 222. The flow of charge through the rectifier 220 results in an increase in the output voltage (Vout) 208. The rate of rise is dependent on the characteristic impedance of the resonant tank 218. The component values of the resonant tank 218 can therefore be optimised to reduce the amount of controlling adjustment required for a given application.

The controller 204 is configured to receive the target signal 210 and to set a switching frequency of the first and second switches 214, 216 of the resonant converter 202 in accordance with a difference between a voltage related to the output voltage (Vout) 208 and the target signal 210. The controller 204a in this example comprises a switch controller 224 and error amplifier circuitry 226.

The error amplifier circuitry 226 comprises a potential divider and an error amplifier 232. The potential divider has a first resistor 228 and a second resistor 230 that are coupled in series between the first plate of the output capacitor 222 and ground such that the output voltage (Vout) 208 is dropped across the two resistors 228, 230. The potential divider provides a divided voltage (with respect to ground) at a junction between the first resistor 228 and the second resistor 230. The divided voltage is an example of a feedback signal 209 representative of an output value that relates to the output voltage (Vout) 208. The feedback signal 209 is supplied to an inverting input of the error amplifier 232.

The error amplifier 232 also receives the target signal (ramp) 210 at its non-inverting input and provides a difference signal (EAout) 234 at its output. An amplitude of the difference signal (EAout) 234 relates to the difference between the feedback signal 209 and the target signal (ramp) 210. When the output voltage (Vout) 208 is lower than required, the difference signal (EAout) 234 will be positive. When the output voltage (Vout) 208 is greater than required, the difference signal (EAout) 234 will be negative.

The switch controller 224 is configured to receive the difference signal (EAout) 234 and set the switching frequency of the first and second switches 214, 216 in accordance with the difference signal (EAout) 234.

The switch controller 224 may be configured to operate the resonant converter 202a only at switching frequencies that are greater than or equal to the resonant frequency of the resonant tank 218. Use of switching frequencies below the resonant frequency can cause inefficiencies in operation of the resonant converter 202 as it can generate capacitive switching, which lowers the efficiency of the system due to switching losses and can damage FET switches 214, 216. Known techniques for preventing capacitive switching are implemented in the TEA1713 and TEA1716 controllers and described in WO 2009/037613.

The switching controller 224 may be configured to decrease the switching frequency if the feedback signal 209 is less than the target signal 210 (the difference signal 234 is positive), as long as the switching frequency is greater than or equal to the resonant frequency of the resonant tank 218. The output voltage (Vout) 208 will be at its maximum when the switching frequency is equal to the resonant frequency. The value for the resonant frequency used by the switching controller 224 may be a measured value, or may be a worst case (highest possible) value given the tolerances of the components in the resonant tank 218. Typical tolerances are 20% for an inductor and 10% for a high voltage capacitor.

The switching controller 224 may be further configured to increase the switching frequency if the feedback signal 209 is greater than the target signal 210 (the difference signal 234 is negative). Increasing the switching frequency away from the resonant frequency results in a reduced output voltage (Vout) 208. Alternatively, the amplifier circuitry 226 may be restricted to providing positive (or zero) difference signals (EAout) 234 at its output.

An example switch controller 224a is illustrated in FIG. 2d.

The switching controller 224a comprises an oscillator unit 236 that provides a square wave oscillator signal 237 with a switching frequency in accordance with the difference signal (EAout) 234. The oscillator signal 237 is provided to a divide-by-two counter 238 that toggles the states of the first and second switches 214, 216. Buffer circuitry 240 is provided to ensure that the first and second switches 214, 216 cannot be closed at the same time, which would result in a short circuit of the supply voltage.

The oscillator 236 comprises a variable current source 242 that provides a current at a level that is related to the difference signal (EAout) 234. A direct current from the current source 242 is provided to a first plate of a timing capacitor 244. The second plate of the timing capacitor 244 is coupled to ground. A potential (or timing voltage) across the timing capacitor 244 increases as the timing capacitor 244 charges up. An oscillator comparator 246 has a non-inverting input coupled to the first plate of the timing capacitor 244 and an inverting input coupled to an oscillator reference voltage 247 (which may be fixed). An output of the oscillator comparator 246 goes high when the timing voltage of the timing capacitor 244 reaches that of the oscillator reference voltage 247. The output of the oscillator comparator 246 is provided to a base of a shorting transistor 248 via a delay buffer 250. The shorting transistor 248 has a conduction channel that couples the first plate of the timing capacitor 244 to the second plate of the timing capacitor 244. Therefore, once the timing capacitor 244 has charged up to the threshold set by the oscillator reference voltage 247, it will be discharged through the shorting transistor 248 after a delay set by the delay buffer 250. A pulse is therefore provided at the output of the oscillator comparator 246 at a frequency dependent on the rate of charging of the timing capacitor 244 as set by the current level provided by the variable current source 247.

The current source 242 may be provided by a bipolar transistor, which provides a current level equal to the base current minus a multiple of the difference signal 234 (Ibase−k*EAout, where k is a constant). The rate of charging of the timing capacitor 244 (and therefore oscillator/switching frequency) will therefore increase as the negative difference signal 234 decreases. That is, the switching frequency will increase when the feedback signal 209 is greater than (or equal to) the target signal 234. Increasing the oscillatory frequency takes the resonant converter 202a further away from the resonant frequency and so reduces the output voltage Vout 208, so allowing the output voltage (Vout) 208 to tend towards the target signal 210.

The value of the base current and/or the oscillator reference voltage 247 may be chosen such that the lowest oscillator frequency is twice the resonant frequency, taking into account the tolerance of the components in the resonant tank 218. For example, if the expected resonant frequency is 2 MHz, then when the tolerance of the tank inductor 218a is 20% and the tolerance of the tank capacitor 218b is 10%, than the worst case (highest possible) resonant frequency may be 2.36 MHz. It will be appreciated that different settings will be appropriate depending on the voltage range of the error amplifier 232 (for example, if the error amplifier 232 can only provide a zero or positive output).

The divide-by-two counter 238 may be implemented using a D-type flip-flop, as shown in FIG. 2c. The flip-flop has a clock input (CLK), an output (Q), an inverted output (Q̄), and a data terminal (D). The clock input (CLK) of the flip-flop receives the output of the oscillator comparator 246 of the oscillator 236. The output (Q) of the counter 238 is provided to the first switch 214 via a path of the buffer circuitry 240. The inverted output (Q̄) is provided to the data terminal (D) and a gate of the second switch 216 via a path of the buffer circuitry 240. Each path of the buffer circuitry 240 comprises a resistor in parallel with a reverse-biased diode (with regard to the flip-flop output) and a capacitor that couples the path to a source of the respective FET switch 214, 216 of that path. In this way, a RCD network is used to implement a delay that is provided during switch commutation to ensure that the first and second switches 214, 216 are not simultaneously closed. It will be appreciated that various other forms of the optional buffer circuiting 240 may be provided.

The switching controller 224a may control the resonant converter 202a such that the output voltage (Vout) 208 follows (lags) the desired output voltage as indicated by the target signal 210. The maximum output voltage (Vout) 208 depends on the Q-factor of the resonant tank 218a and the input voltage 207 of the resonant converter 202a.

FIGS. 3a and 3b illustrate a voltage generator 300, 300a similar to that of FIG. 1 in which the operating parameter is a state of the switches in the resonant converter. FIG. 3a illustrates a block diagram of the voltage generator 300.

The voltage generator 300 comprises a resonant converter 302 and a controller 304. The controller 304 is configured to receive a target signal 310 and to provide a control signal 312 to set an operating parameter of the resonant converter 302 in accordance with a resonant tank feedback signal 360 representative of a current level in a resonant tank of the resonant converter 302; a feedback signal 309 that is similar to the corresponding feedback signal of FIG. 2a; and the target signal 310.

The controller 304 is configured to operate the first and second switches 314, 316 in order to define a switching cycle that has a specific phase relative to the sinusoidal current in the resonant tank of the resonant converter 302. The controller 304 uses the phase of the switching cycle as the operating parameter. That is, the controller 304 is configured to modify the phase of the switching frequency in accordance with the difference between the target signal 310 and the feedback signal 309 which is related to the output voltage 308.

The optimum instance for commutating the resonant converter 302 in order to maximise the output voltage is the instant that the tank current in the resonant converter is zero. This corresponds to switching the resonant converter at the resonant frequency. Altering the phase of commutation so that switching does not coincide with when the tank voltage 360 is zero means that less energy is imparted to the resonant tank by each switching cycle. This causes a reduction in the output voltage (Vout) 308.

In this example, the controller 304 may not need to use an adapted resonant switching frequency to account for the tolerances of the resonant tank. This is because the tolerances of the resonating components will be automatically taken into account by such methodology as the resonant converter 302 is controlled in accordance with measured values of current in the resonant tank as opposed to theoretical values.

The controller 304 may be used after an initial switching cycle of the half bridge has been completed as it requires measurements from a previous switching cycle to function correctly. An oscillator, such as that described with reference to FIG. 2 for example, may be used to generate the initial switching cycle, or cycles, in order to set up resonance in the resonant tank 318.

An implementation of the voltage generator 300 of FIG. 3a will be described with reference to FIG. 3b, which illustrates a circuit diagram of an example voltage generator 300a. The voltage generator 300a comprises a resonant converter 302a and a controller 304a. The controller 304a has error amplifying circuitry 326 and a switching controller (the remainder of the controller 304a).

The resonant converter 302a is similar to that illustrated in FIG. 2b, except for modifications to the resonant tank 318, which comprises a sampling capacitor 319a and a sampling resistor 319b coupled in series. The series arrangement of the sampling capacitor 319a and the sampling resistor 319b are provided in parallel with the tank capacitor 318b. The sampling capacitor 319a may have a capacitance that is substantially lower, such as 100, 1000 or 10,000 times lower, than the capacitance of the tank capacitor 318b. The voltage dropped across the sampling resistor 319b is proportional to the current in the sampling capacitor 319a and is referred to as a tank voltage 360. The tank voltage 360 is therefore indicative of a current in the resonant tank 318.

The tank voltage 360 enables the controller 304a to determine the instantaneous phase in the sinusoidal resonant tank current. The controller 304a can modify the timing of commutation of the first and second switches 314, 316 of the resonant converter 302a so that switching occurs at a specific point/phase in the sinusoidal resonant current. It will be appreciated that, in general, a switch commutation at one phase position of a resonant cycle will add a different amount of energy to the resonant tank 318 than application of a switch commutation at a different phase position of the resonant cycle. As such, the phase timing of switch commutation can be used to vary the output voltage (Vout) 308 of the resonant converter 302a.

The error amplifier circuitry 326 provides a difference signal 334 in accordance with the target signal 310 and the feedback signal 309 which is related to the output voltage 308. The error amplifier circuitry 326 is substantially as described with reference to FIG. 2b, but may be configured to limit, or clamp, the possible value of the difference signal 334 to be equal to, or just below, the maximum possible tank voltage that may be taken across the sampling resistor 319b. This modification is desirable to ensure that switching is not halted in the case when the highest possible difference signal 334 increases above the tank voltage. Such clamping is well known by those skilled in the art of the designing of integrated circuits. In this example, the error amplifier circuitry 326 may be limited to providing a difference signal (EAout) 310 that cannot have a negative value.

The controller 304a is configured to compare the tank voltage 360 with the difference signal 334. The controller 304a may optionally be configured to compare the tank voltage 360 with the modulus of the difference signal 334. In the example of FIG. 3b such a comparison is achieved by employing a first comparison path 362 and a second comparison path 364. An analogue inverter 366 is provided between the error amplifying circuitry 326 and the second comparison path 364 so that the second comparison path 364 receives an inverted difference signal.

Each comparison path 362, 364 comprises a comparator 362a, 364a that compares the tank voltage 360 with the difference signal 334 and a buffer 362b, 364b that buffers the output of the comparator 362a, 364a. The comparator 362a of the first comparison path 362 receives the tank voltage 360 at an inverting input and the difference signal 334 at a non-inverting input. The comparator 364a of the second comparison path 364 receives the tank voltage 360 at a non-inverting input and the difference signal 334 at an inverting input. The buffers 362b, 364b receive the Boolean output from the respective comparators 362a, 364a and produce a pulse on each rising edge between a low and high signal. Output of the logic paths may be better understood with reference to FIG. 3c, which is discussed in further detail below.

Logic 368 performs an 'OR' operation on the signals received from the first and second comparison paths 362, 364 and provides an oscillator pulse 369 to a divide-by-two counter 338.

The divide-by-two counter 338 may be implemented using a D-type flip-flop having a clock input (CLK), an output (Q), an inverted output ($\overline{Q}$), and a data terminal (D). The clock input (CLK) of the flip-flop receives the output of the OR gate. The output (Q) of the counter 338 may be provided to the first switch 314 of the resonant converter 302a via a path of buffer circuitry, such as the buffer circuitry in FIG. 2c. The inverted output ($\overline{Q}$) may be provided to the data terminal (D) and a gate of the second switch 316 of the resonant converter 302a via a path of the buffer circuitry.

FIG. 3c illustrates graphically a tank voltage 360a, a high difference signal 334a and a low difference signal 334b that may be present in the circuit of FIG. 3b. The tank voltage 360a is a sinusoidal signal that has positive and negative values. The high and low difference signals 334a, 334b are representative of difference signals that may be provided by the error amplifier circuitry 326 depending upon the difference between the feedback signal 309 and the target signal 310. The high and low difference signals 334a, 334b are positive values in all instances as the error amplifier circuitry 326 is limited to providing positive difference signals 334 in this example. The difference signals 334a, 334b are illustrated mirrored across the horizontal axis, to illustrate both: i) the difference signal 334 that is provided to the first comparison path 362 of FIG. 3b; and ii) the inverted difference signal that is provided to the second comparison path 364 of FIG. 3b.

FIG. 3c also illustrates oscillator pulses 369a, 369b that are produced by the switching controller and relate to respectively the corresponding positive low difference signals 334a and high difference signals 334b intersecting the tank voltage 360a. Corresponding oscillator pulses 369c, 369d are produced for the associated negative difference signals 334a, 334b. It will be appreciated that the high and low difference signals 334a, 334b are illustrative of different circuit states and are not provided simultaneously. The corresponding oscillator pulses 369a, 369b are presented on different time axes to illustrate this.

The configuration of the comparison paths 362, 364 of the controller 304a are such that the switches 314, 316 are commutated when the modulus of the tank voltage 360 falls below the difference signal 334. For example, the comparator 362a of the first comparison path 362 provides a high output signal when the tank voltage 360 falls below the difference signal 334. The corresponding buffer 362b produces a pulse on the transition from a low to high comparator 362a output.

FIG. 3c demonstrates that the oscillator pulse 369 (which results in commutation of the first and second switches 314, 316) occurs at a different phase position of the sinusoidal tank voltage waveform 360a depending upon the amplitude of the difference signal 334. That is, there is a phase difference between the oscillator pulses 369a associated with high difference signal 334a and the oscillator pulses 369b associated with lower difference signals 334b.

The oscillator pulses 369b associated with the low difference signal 334b are provided near to the zero-crossing of the tank voltage 360a, whereas the oscillator pulses 369a associated with the high difference signal 334a are provided further away from the zero-crossing of the tank voltage waveform 360a, nearer the maximum value of the tank voltage waveform 360a. When commutation of the switches 314, 316 takes place before the current in the resonant tank 318 has dropped to zero, less energy is put into the resonant tank 318 per full switching cycle, and so less charge is transferred to the output capacitor per unit time. The net effect of the difference in the phase of commutation on the switching frequency is small; the main influence of the phase of commutation is that the average tank voltage changes and therefore so does the output voltage. The amplitude of the tank voltage waveform 360 tends to increase when the difference signal 334 is low and tends to decrease when the difference signal 334 is high.

If the output voltage 308 is greater than the desired output voltage (as indicated by the target signal 310), commutation is performed such that the instants in time at which the switches are operated are set such that they do not coincide with a zero-crossing of the tank voltage waveform 360a so that the output voltage 308 is reduced. In this way, the ramp-up speed of the output voltage (Vout) 308 can be controlled. A consequence of this type of control algorithm is that the output voltage 308 may tend to lead the target signal 310.

In the case where the difference signal 334 equals the peak of the tank voltage waveform 360a, the average rate of energy addition to the resonant tank 318 is zero. During half the on-time of the positive half wave of the tank voltage waveform 360a, the input voltage to the resonant tank is Vin; the other half of that time it is zero. The average voltage is therefore Vin/2, and the associated increase of energy equals that of a regular switching but with Vin/2. However, during the negative part of the tank voltage waveform 360a, the input voltage is also present, but in this part of the sine wave the additional voltage counteracts the current. That is, the energy that is put into the resonant tank 318 during the positive half wave is removed during the negative half wave and so there is no net increase in the energy in the resonant tank or the output voltage.

The level of performance of the voltage generators described above with reference to FIGS. 2 and 3 can be dependent on the required conversion ratio (output voltage/ input voltage). At a low input voltage (such as 1 to 3 V, for example), a limited amount of energy can be put into the resonant tank in each switching cycle, thereby limiting the possible maximum output voltage. In addition, the resonant currents in the resonant tank can become quite high in some implementations. The demands of handling high currents can require the resonant tank to have a high quality factor and can also mean that higher accuracy in switch commutation timing and voltage sensing may be required.

FIG. 4a illustrates a block diagram of a voltage generator 400 in which the converter 402 comprises a first stage converter 402a in addition to a resonant converter 402b. The resonant converter 402b can be a standard resonant converter or any resonant converter described herein. It will be appreciated that a standard resonant converter can be controlled such that it has a switching frequency that corresponds with the resonant frequency of the converter, thereby maximising the output voltage for a given input voltage to the resonant converter.

The first stage converter 402a receives a supply voltage 406 and provides the input voltage to the resonant converter 402b. The voltage generator 400 can address the above problems by providing an input voltage 407 to the resonant converter 402 that is higher than the supply voltage 406, which therefore reduces the conversion ratio required of the resonant converter 402b. In such an example, the input voltage of resonant converter is the operating parameter of the converter that can be set.

The resonant converter 402b is configured to receive the input voltage (Vin) 407 and provide an output voltage (Vout) 408. As the amount of energy that can be added to a resonant tank of the resonant converter 402b in a switching cycle depends on the input voltage 407 of the resonant converter 402b, the output voltage (Vout) of the converter can therefore be controlled by setting the input voltage 407 of the resonant converter 402b.

The voltage generator 400 comprises a controller 404 that is configured to receive a target signal 410 and provide a control signal 412 to set a parameter, in this example a switching frequency, of the first stage converter 402a in accordance with a feedback signal 409 which is related to the output voltage (Vout) 408 and the target signal 410. The switching frequency of the first stage converter 402a affects the voltage (Vin) 407 (which is the input voltage to the resonant converter 402b) that is generated by the first stage converter 402a from the supply voltage 406 (Vsupply). In effect, the controller 404 sets an input voltage 407 of the resonant converter 402b as an operating parameter in accordance with a difference between the feedback signal 409 and the target signal 410.

An implementation of the voltage generator 400 of FIG. 4a will be described with reference to FIG. 4b, which illustrates a circuit diagram of an example voltage generator 400a. The voltage generator 400a has a converter 402c comprising a first stage converter 402d and a resonant converter 402e. In this example, the first stage converter 402d is a boost converter that is configured to receive the supply voltage 406 and to provide an input voltage 407 to the resonant converter 402e. It will be appreciated that other converters could be used.

The resonant converter 402e is similar to that of FIG. 2b and common components between these figures will not be discussed in further detail here. The resonant converter 402e further comprises a resonant switching controller 490 that may be configured to operate the resonant converter 402e at its resonant frequency, which is the most efficient mode in which to operate the resonant converter 402e.

The first stage converter 402d comprises a boost inductor 492, a boost rectifier 494 and a boost switch 496. The boost inductor 492 has first terminal and a second terminal. The first terminal is arranged to receive the supply voltage 406. The boost rectifier 494 is connected to the second terminal of the boost inductor 492 and is configured to provide the input voltage 407 of the resonant converter 402e. The boost switch 496 is connected between the second terminal of the boost inductor 492 and ground. The boost switch 496 can be provided by a FET, in which case a conduction channel of the FET is connected between the second terminal of the boost inductor 492 and ground.

The voltage generator 400a also comprises a controller 404a. The controller 404a comprises a switch controller 424 and error amplifier circuitry 426. The error amplifier circuitry 426 is similar to that of FIG. 2b or 3b and provides a difference signal (EAout) 434 to the switch controller 424 in accordance with a difference between the output voltage 408 and the target signal 410. The switch controller 424 is configured to set a switching frequency or state of the boost switch 496 in accordance with the difference signal (EAout) 434. The output of the boost converter 402d is related to the switching frequency of the boost switch 496 as is known in the art. In this way, the output voltage can be made to conform to the desired voltage indicated by the target signal 410.

It will be appreciated that features described in relation to one example may be provided in addition to the features illustrated in any other example, unless an intention to the contrary is apparent.

Terms such as "steep", "rapid", "large", "small", "high", "low", etc. used herein can be considered as greater than a threshold value, less than a threshold value, or between two threshold values depending upon the context.

Any components that are described herein as being "coupled" or "connected" could be directly or indirectly coupled or connected. That is, one or more components could be located between two components that are said to be coupled or connected whilst still enabling the required functionality to be achieved.

The invention claimed is:

1. A voltage generator for providing an output voltage in accordance with a received target signal, the voltage generator comprising:
   a resonant converter configured to receive an input voltage, the resonant converter comprising:
   a first switch;
   a second switch connected in series with the first switch between the input voltage and ground (GND);
   a resonant tank associated with the second switch;
   an output capacitor coupled to the resonant tank and configured to provide an output voltage; and
   a diode connected directly to the resonant tank and configured to allow charge to flow in a single direction from the resonant tank to the output capacitor;
   an output located directly between the diode and the output capacitor to output the output voltage; and
   a controller configured to receive the target signal and to set an operating parameter of the resonant converter in accordance with a difference between an output value which is related to the output voltage at the output and the target signal;
   wherein the first switch and the second switch are transistor switches in which the drain-source conduction channels of the respective transistor switches are in series; and
   wherein the first switch and the second switch are connected in a half-bridge configuration with the resonant tank connected between the first switch and the second switch.

2. The voltage generator of claim 1 wherein the operating parameter is a state of the first switch or the second switch.

3. The voltage generator of claim 2 wherein setting an operating parameter comprises toggling the states of the first switch and second switch.

4. The voltage generator of claim 1 wherein the controller is configured to set the operating parameter in accordance with a comparison between a value related to a current in the resonant tank and a value related to the difference.

5. The voltage generator of claim 4 wherein the controller is configured to set the operating parameter when the value related to the resonant tank current is greater than the value related to the difference.

6. The voltage generator of claim 4 wherein the controller is configured to operate the first and second switches at a specific point in time during a sinusoidal resonant tank current, such that the operating parameter is the phase of the sinusoidal resonant tank current at which the first and second switches are operated.

7. The voltage generator of claim 4 wherein the value related to the difference is a modulus of the difference.

8. The voltage generator of claim 7 wherein the controller is configured to restrict the operation of the first and second switches to switching frequencies that are greater than or equal to a resonant frequency of the resonant tank.

9. The voltage generator of claim 8 wherein the controller is configured:
to increase the switching frequency if the output value is greater than the target signal; and
to decrease the switching frequency if the output value is less than the target signal, as long as the switching frequency is greater than or equal to a resonant frequency of the resonant tank.

10. The voltage generator of claim 1 wherein the controller is configured to operate the first and second switches according to a switching cycle that has a switching frequency, wherein the operating parameter is the switching frequency.

11. The voltage generator of claim 1 wherein the operating parameter is the input voltage of the resonant converter.

12. The voltage generator of claim 11 comprising a first stage converter configured to receive a supply voltage and to provide the input voltage of the resonant converter.

13. The voltage generator of claim 12 wherein the controller comprises a switching controller configured to operate the first stage converter in accordance with the difference between the output value and the target signal.

14. The voltage generator of claim 13 wherein the first stage converter is a boost converter comprising:
a boost inductor with a first terminal and a second terminal, the first terminal connected to the supply voltage;
a boost rectifier connected to the second terminal of the boost inductor and configured to provide the input voltage of the resonant converter; and
a boost switch connected between the second terminal of the boost inductor and ground,
wherein the switching controller is configured to operate the boost switch in accordance with the difference between the output value and the target signal.

15. A mobile computing device comprising the voltage generator of claim 1.

16. The voltage generator of claim 1 in which the direct connection between the resonant tank and the diode is free of a transformer.

17. The voltage generator of claim 1 wherein the first switch and the second switch are MOSFETs in which the drain-source conduction channels of the respective MOSFETs are in series.

* * * * *